United States Patent
Pampu et al.

(10) Patent No.: US 9,749,923 B2
(45) Date of Patent: Aug. 29, 2017

(54) METHOD FOR RE-SELECTING A COMMUNICATION NETWORK

(71) Applicants: Huawei Technologies Co., Ltd., Shenzhen (CN); Fraunhofer Institut Fokus, Berlin (DE)

(72) Inventors: Cornel Pampu, Berlin (DE); Qing Zhou, Berlin (DE); Marius Corici, Berlin (DE); Alberto Diez, Berlin (DE); Thomas Magedanz, Berlin (DE); Dragos Vingarzan, Berlin (DE)

(73) Assignees: HUAWEI TECHNOLOGIES CO., LTD., Shenzhen (CN); FRAUNHOFER-GELSELLSCHAFT zur Förderung der angewandten Forschung e.V., Munich (DE)

( * ) Notice: Subject to any disclaimer, the term of this patent is extended or adjusted under 35 U.S.C. 154(b) by 254 days.

(21) Appl. No.: 13/631,224

(22) Filed: Sep. 28, 2012

(65) Prior Publication Data
US 2013/0265986 A1    Oct. 10, 2013

Related U.S. Application Data

(63) Continuation of application No. PCT/CN2010/071425, filed on Mar. 30, 2010.

(51) Int. Cl.
*H04L 12/28* (2006.01)
*H04W 36/30* (2009.01)
(Continued)

(52) U.S. Cl.
CPC .......... *H04W 36/30* (2013.01); *H04W 48/18* (2013.01); *H04W 36/14* (2013.01)

(58) Field of Classification Search
CPC ..... H04W 36/08; H04W 36/12; H04W 36/14; H04W 36/30; H04W 36/0055;
(Continued)

(56) References Cited

U.S. PATENT DOCUMENTS 6,510,146 B1    1/2003  Korpela et al.
6,701,149 B1    3/2004  Sen et al.
(Continued)

FOREIGN PATENT DOCUMENTS

CN            1645960 A       7/2005
CN          101072432 A      11/2007
(Continued)

OTHER PUBLICATIONS

International Search Report and Written Opinion of the International Searching Authority issued in corresponding PCT Patent Application No. PCT/CN2010/071425, mailed Jan. 6, 2011.
(Continued)

*Primary Examiner* — Edan Orgad
*Assistant Examiner* — Sithu Ko
(74) *Attorney, Agent, or Firm* — Brinks Gilson & Lione

(57) ABSTRACT

The present disclosure relates to a method for re-selecting a communication network. The method comprises receiving a network access request indicating a request to access to a communication network by a communication device, determining upon the basis of the network access request as to whether communication resources of the communication network are available for the communication device, and re-selecting another communication network for the communication device if the communication resources are not available for the communication device.

12 Claims, 10 Drawing Sheets

(51) Int. Cl.
*H04W 48/18* (2009.01)
*H04W 36/14* (2009.01)

(58) Field of Classification Search
CPC ... H04W 48/16; H04W 84/12; H04W 84/047;
H04W 88/06; H04W 16/26; H04L 12/66;
H04L 65/1016; H04L 65/1069
USPC .................. 370/315, 331, 338, 352; 455/439
See application file for complete search history.

(56) References Cited

U.S. PATENT DOCUMENTS

| | | | |
|---|---|---|---|
| 6,973,303 | B1 | 12/2005 | Meidan |
| 7,346,045 | B2 | 3/2008 | Montes |
| 7,369,525 | B2 | 5/2008 | Stuempert et al. |
| 7,376,104 | B2 | 5/2008 | Diachina et al. |
| 7,437,178 | B2 | 10/2008 | Jeong et al. |
| 7,447,487 | B2 | 11/2008 | Moore |
| 7,454,213 | B2 | 11/2008 | Toelli |
| 7,457,265 | B2 * | 11/2008 | Julka .................... H04W 92/24 370/331 |
| 7,492,740 | B2 | 2/2009 | Sipilae et al. |
| 7,697,930 | B2 * | 4/2010 | Miao ................ H04W 36/0011 370/328 |
| 2002/0160777 | A1 | 10/2002 | Takao et al. |
| 2003/0017842 | A1 | 1/2003 | Moles et al. |
| 2003/0195003 | A1 | 10/2003 | Cao et al. |
| 2005/0026616 | A1 | 2/2005 | Cavalli et al. |
| 2005/0037765 | A1 | 2/2005 | Rajkotia et al. |
| 2005/0070288 | A1 * | 3/2005 | Belkin et al. ................. 455/439 |
| 2005/0085247 | A1 * | 4/2005 | Bajko et al. .................. 455/466 |
| 2005/0096063 | A1 | 5/2005 | Muniere |
| 2005/0099943 | A1 | 5/2005 | Naghian et al. |
| 2005/0141471 | A1 | 6/2005 | Virtanen et al. |
| 2005/0227691 | A1 * | 10/2005 | Pecen et al. ............... 455/435.2 |
| 2006/0068786 | A1 | 3/2006 | Florence |
| 2006/0111111 | A1 | 5/2006 | Ovadia |
| 2006/0128392 | A1 | 6/2006 | Turina et al. |
| 2006/0189331 | A1 | 8/2006 | Lundsjo et al. |
| 2006/0209798 | A1 * | 9/2006 | Oikarinen et al. ............ 370/352 |
| 2006/0223575 | A1 | 10/2006 | Su |
| 2006/0251023 | A1 | 11/2006 | Choi |
| 2006/0268848 | A1 | 11/2006 | Larsson et al. |
| 2006/0285489 | A1 | 12/2006 | Francisco et al. |
| 2007/0019580 | A1 * | 1/2007 | Zhang et al. .................. 370/315 |
| 2007/0036120 | A1 * | 2/2007 | Zhang et al. .................. 370/338 |
| 2007/0123267 | A1 | 5/2007 | Whinnett et al. |
| 2007/0165583 | A1 * | 7/2007 | Pecen .......................... 370/338 |
| 2007/0183394 | A1 * | 8/2007 | Khandelwal et al. ........ 370/352 |
| 2007/0207822 | A1 | 9/2007 | Andersson et al. |
| 2007/0237126 | A1 * | 10/2007 | Pirila ..................... H04W 8/245 370/349 |
| 2007/0263591 | A1 | 11/2007 | Diachina et al. |
| 2008/0102847 | A1 | 5/2008 | Kim et al. |
| 2008/0125113 | A1 * | 5/2008 | Kono .......................... 455/432.1 |
| 2008/0125124 | A1 | 5/2008 | Craig |
| 2008/0192696 | A1 | 8/2008 | Sachs et al. |
| 2008/0288736 | A1 * | 11/2008 | Lawson et al. ................ 711/164 |
| 2009/0023447 | A1 | 1/2009 | Hagerman et al. |
| 2009/0052402 | A1 | 2/2009 | Sachs et al. |
| 2009/0059861 | A1 | 3/2009 | Gunnarrson et al. |
| 2009/0109925 | A1 * | 4/2009 | Nakamura ............ H04L 63/062 370/331 |
| 2009/0168766 | A1 * | 7/2009 | Eyuboglu ......... H04W 36/0022 370/353 |
| 2009/0170517 | A1 | 7/2009 | Karlsson et al. |
| 2009/0215404 | A1 * | 8/2009 | Kesavan ............... H04W 48/18 455/73 |
| 2009/0233601 | A1 | 9/2009 | Vikberg et al. |
| 2009/0239536 | A1 | 9/2009 | Fallgren et al. |
| 2009/0258651 | A1 | 10/2009 | Sagfors et al. |
| 2009/0262707 | A1 * | 10/2009 | Wu .................... H04W 36/0044 370/332 |
| 2009/0275309 | A1 * | 11/2009 | He .............................. 455/410 |
| 2009/0275332 | A1 | 11/2009 | Niska et al. |
| 2010/0020753 | A1 * | 1/2010 | Fulknier et al. ............. 370/329 |
| 2010/0041401 | A1 | 2/2010 | Moore |
| 2010/0067375 | A1 | 3/2010 | Ianev |
| 2010/0067456 | A1 | 3/2010 | Xu et al. |
| 2010/0113010 | A1 * | 5/2010 | Tenny et al. .................. 455/423 |
| 2010/0121960 | A1 * | 5/2010 | Baniel et al. ................. 709/228 |
| 2010/0150112 | A1 * | 6/2010 | Lee et al. ..................... 370/332 |
| 2010/0151863 | A1 * | 6/2010 | Kubo ............................ 455/436 |
| 2010/0192212 | A1 * | 7/2010 | Raleigh .......................... 726/7 |
| 2010/0195608 | A1 * | 8/2010 | Ishizu et al. .................. 370/329 |
| 2010/0260139 | A1 | 10/2010 | Baeckstroem et al. |
| 2010/0284365 | A1 | 11/2010 | Sundell et al. |
| 2011/0003545 | A1 * | 1/2011 | Vainikka et al. ................ 455/9 |
| 2011/0016534 | A1 * | 1/2011 | Jakobsson et al. ............ 726/28 |
| 2011/0032898 | A1 * | 2/2011 | Kazmi et al. ................. 370/329 |
| 2011/0082937 | A1 * | 4/2011 | Barbaresi .............. H04W 36/14 709/226 |
| 2011/0223916 | A1 | 9/2011 | Miklos et al. |
| 2012/0276904 | A1 | 11/2012 | Bachmann et al. |

FOREIGN PATENT DOCUMENTS

| | | |
|---|---|---|
| CN | 101198147 A | 6/2008 |
| EP | 1240803 | 9/2002 |
| EP | 1725052 A1 | 11/2006 |
| EP | 1763273 A1 | 3/2007 |
| EP | 1752005 B1 | 12/2007 |
| EP | 1916865 A2 | 4/2008 |
| EP | 1954077 A1 | 8/2008 |
| EP | 1962471 A1 | 8/2008 |
| EP | 1986372 A1 | 10/2008 |
| EP | 2036375 B1 | 10/2012 |
| WO | WO 95/33352 A2 | 12/1995 |
| WO | WO 0115482 A1 * | 3/2001 |
| WO | WO 01/47298 A2 | 6/2001 |
| WO | WO 2006126957 A2 | 11/2006 |
| WO | WO 2006137779 A1 | 12/2006 |
| WO | WO 2007/097667 A1 | 8/2007 |
| WO | WO 2008000736 A1 | 1/2008 |

OTHER PUBLICATIONS

Olaziregi et al. "A Novel Approach for Reconfigurable Systems at RAN Level" IEEE 2003.
Lte, "3rd Generation Partnership Project; Technical Specification Group Core Network and Terminals; Access to the 3GPP Evolved Packet Core (EPC) via non-3GPP Access Networks; Stage 3" (Release 9) 3GPP TS 24.302. V9.1.1, Dec. 2009.
Lte, "3rd Generation Partnership Project; Technical Specification Group Services and System Aspects; Architecture Enhancements for non-3GPP Accesses" (Release 9) 3GPP TS 23.402. V9.4.0, Mar. 2010.
Lte, "3rd Generation Partnership Project; Technical Specification Group Services and System Aspects; Policy and Charging Control Architecture" (Release 9) 3GPP TS 23.203. V9.4.0, Mar. 2010.
Lte, "3rd Generation Partnership Project; Technical Specification Group Services and System Aspects; General Packet Radio Service (GPRS) Enhancements for Evolved Universal Terrestrial Radio Access Network (E-UTRAN) Access" (Release 9) 3GPP TS 23.401. V9.4.0, Mar. 2010.
Carvalho de Gouveia et al., "POBUCS Framework: Integrating Mobility and QoS Management in Next Generation Networks" Technical University of Berlin, 2005.
Latvakoski et al., "Application Based Access System Selection Concept for all IP Mobile Terminals" IEEE 2002.
Thanh et al., "Link-based Service Customization for NGN" ICACT, Feb. 17-20, 2008.
Issa et al., "Low-Complexity Call-Management Scheme for Cellular Networks" IEEE Transactions on Vehicular Technology, vol. 25, No. 1, Jan. 2009.
Wang et al., "QoS-Aware Network-supported Architecture to Distribute Application Flows over Multiple Network Interfaces for B3G Users" Wireless Pers Commun DOI 10.1007/s11277-007-9424-7. Springer Science+Business Media LLC 2007.

(56) References Cited

OTHER PUBLICATIONS

Daoud et al., "UFA: Ultra Flat Architecture for High Bitrate Services in Mobile Networks" IEEE 2008.

* cited by examiner

METHOD FOR RE-SELECTING A COMMUNICATION NETWORK

CROSS-REFERENCE TO RELATED APPLICATION

This application is a continuation of International Application No. PCT/CN2010/071425, filed on Mar. 30, 2010, entitled "Method for re-selecting a communication network," which is hereby incorporated herein by reference.

BACKGROUND

The present disclosure relates to communicating over access communication networks.

The current state of the art considers separately the handover procedures from the session establishment procedures, for example in 3GPP and Internet Engineering Task Force (IETF). More specifically, the handover procedures are now triggered based on a change on the physical parameters of the source access network, e.g. changes of the signal strength visible for the mobile device, or on a network initiated command. These solutions are suitable for deployment environments in which there are few access networks which overlap, which reduces the access network selection procedure to the few access networks available. In contrast, in the environments in which multiple access networks overlap largely, the physical parameters are not as important because continuity can be guaranteed by more than one access network. Instead, for handovers in these environments an important parameter for the network selection is the capacity of the access network to sustain the momentary requirements of the user of the mobile device reflected in the available resources in the specific access networks.

Currently, the session establishment procedures do not consider that the session can be established over other access networks than the access network through which the mobile device is connected to. This implies that the resource reservation procedures for the sessions are executed over the access network to which the mobile device is connected to and that the service is established only when enough resources are available to guarantee the requirements. In case that the access network cannot sustain the requirements of the session, it is released because of the missing resources.

During a session establishment procedure, the resources required by a mobile device may change. This change of the required resources implies a change in the operational costs for the operator for the specified mobile device. Sustaining the required resources over one access network has a different operational cost than sustaining the same required resources over another access network. Thus, the operator may prefer that the mobile device hands over to another access network which reduces the momentary operational costs when the specified change of the required resources happens. This case is a generalization of the case in which the sessions are released because of the missing resources, considering the operational costs of reserving resources over the access network to which the mobile device is connected to as infinite. This consideration can be made as the resources can not be reserved. The same considerations apply for a session release. In this case the momentary required resources by the mobile device decrease therefore they change.

With reference to the 3GPP Evolved Packet Core (EPC) architecture, at session establishment, the 3GPP EPC releases the session if no resources are available in the access network to which the UE (User Endpoint) is connected to. However, if an interaction between the Policy and Charging Control entities and the network selection functionality is not considered, then the architecture may release the session even when other access networks to which the UE is not connected to are available and can sustain the session. The 3GPP Evolved Packet Core (EPC) addresses the task of network discovery and handover procedures using an Access Network Discovery and Selection Function (ANDSF) which transmits policies to the mobile device. On specific conditions, the UE alone initiates the handover procedures. The policies transmitted by the ANDSF do not consider changes on the required resources of the mobile device.

SUMMARY

A goal to be achieved by the present disclosure is to more efficiently control accessing to access communication networks in particular when the communication resources required by a communication device are subject to changes.

The present disclosure is based on the finding that an access to access communication networks may more efficiently be controlled if an automatically re-selection of another communication network give an access to a certain communication network is not possible e.g. due to limited communication resources such as bandwidth or authorizations. By way of example, a re-selection of an access network may be performed if the communication resources required by e.g. a mobile device change.

By way of example, access network reselection may be performed when the required resources of a mobile device change due to a session establishment or release, by introducing a new reference point between the policy control function for resource reservation which is in charge of reserving or releasing the resources required by the mobile device and the network re-selection decision function. A re-selection of the access network to which the mobile device is attached to is triggered and can be executed due to the modification of the requirements in resources of the mobile device, information which is available at the policy control function.

According to an aspect, a method for re-selecting a communication network is provided. The method comprises receiving a network access request indicating a request to access to a communication network by a communication device, determining upon the basis of the network access request as to whether communication resources of the communication network are available for the communication device, and re-selecting another communication network for the communication device if the communication resources are not available for the communication device. The network access request may indicate e.g. a certain application for a certain bandwidth requirement of the communication device. If the available communication resources are not sufficient to cover the bandwidth demand of transmitting the certain application then, automatically, another access network may be selected for the communication device. Thus, the communication device may attempt to access to the other communication network, wherein the inventive method may again be performed.

According to an implementation, the communication resources are not available for the communication device if the communication resources provided by the communication network are not sufficient to support the requested access to the communication network, or if the communication device is not authorized to access to the communication resources of the communication network, or if the communication resources provided by the communication network cannot be reserved for the communication device. The communication resources may e.g. be associated with available bandwidth or a certain signal-to-noise ratio or a number of supported communication channels.

According to an implementation, the re-selection of the other communication network comprises initiating a handover of the communication device to the other communication network. Preferably, the handover may be performed by a base station or by the communication device upon receiving information indicating the other communication network.

According to an implementation, the method may comprise transmitting a network re-selection request to the communication device or to a network entity, in particular to a base station, to indicate the network re-selection. Upon receiving the re-selection request, the communication device may e.g. initiate a handover to the other communication network.

According to an implementation, the method may further comprise transmitting information on the other communication network to the communication device or to a network entity, in particular to a base station or to any access point. Upon receiving the information indicating the other communication network, e.g. the communication device or the network entity may perform a handover to the other communication network.

According to an implementation, the communication resources may comprise a data rate or a bandwidth or a communication channel, or a communication frequency, or at least one quality of service parameter such as e.g. a bit error rate.

According to implementation, the method may be executed by default or if a previous resource reservation has failed or upon a change of a communication session.

According to another aspect, a method for accessing to a communication network is provided. The method comprises transmitting a network access request towards the communication network to indicate a request to access to the communication network by a communication device, receiving a network re-selection request over the communication network instructing to select another communication network, in particular instructing to handover to the other communication network, and re-selecting the other communication network in response to the network re-selection request. The network re-selection request may be transmitted upon on the basis of the above described method for re-selecting a communication network. Accordingly, the other communication network is re-selected if e.g. a requested access to the communication network has not in granted.

According to an implementation, the network access request may be transmitted by a policy control function of the communication device or of another network entity. The policy control function may be a software function implementing e.g. a functionality of a medium access layer.

According to an implementation, the network re-selection is indicated by a policy control function of the communication device or of another network entity. Thus, the policy control function may be a central function controlling the access and the re-selection of communication networks.

According to another aspect, a network selector being configured to select a communication network is provided. The network selector comprises a receiver which is configured to receive a network access request indicating a request to access to the communication network by the communication device, a resource controller being configured to determine upon the basis of the network access request as to whether communication resources of the communication network are available for the communication device, and a network controller being configured to re-select another communication network for the communication device if the communication resources are not available for the communication device. Preferably, the network selector may form an access point device controlling an access to the communication network.

According to an implementation, the network controller may be configured to transmit a network re-selection request to the communication device in order to re-select the other communication network. Thus, the network controller may directly communicate with the communication device in order to initiate e.g. a handover to the other communication network.

According to an implementation, a method for access network reselection as part of the session establishment modification or release procedures is provided. The method addresses the cases in which the preferences of the operator and of the user of the mobile device are changed due to the session that is to be updated.

According to an implementation, a system architecture is proposed which enables the access network reselection as part of the session establishment or release procedures conformant to the proposed method. The architecture here presented is based and not limited to the 3GPP Evolved Packet Core (EPC) standardized by 3GPP.

According to another aspect, a computer program is provided. The computer program comprises a program code for executing at least one of the inventive methods when run on a computer.

BRIEF DESCRIPTION OF THE DRAWINGS

Further embodiments of the present disclosure will be described with respect to the following drawings, in which.

DETAILED DESCRIPTION OF THE EMBODIMENTS

Figure 1:
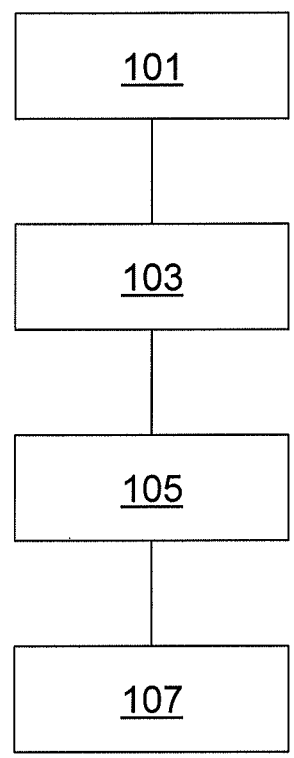
FIG. 1 shows a diagram of a method for re-selecting the communication network.

FIG. 1 shows a diagram of a method for re-selecting a communication network comprising receiving 101 a network access request indicating a request to access to a communication network by a communication device, determining 103 upon the basis of the network access request as to whether communication resources of the communication network are available for the communication device, and re-selecting 105 another communication network for the communication device if the communication resources are not available for the communication device.

The method may further comprise transmitting 107 a network re-selection request to the communication device in order to indicate or initiate the network re-selection, e.g. in order to initiate a handover.

Figure 2:
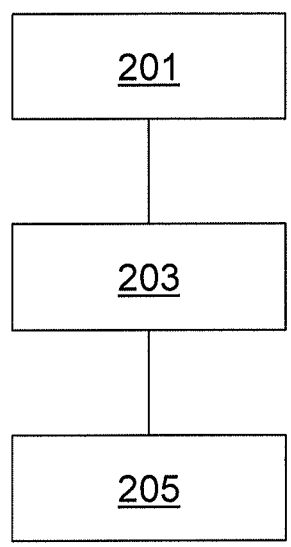
FIG. 2 shows a diagram of a method for accessing to a communication network.

FIG. 2 shows a block diagram of a method for accessing to a communication network. The method comprises transmitting 201 a network access request towards the communication network to indicate a request to access to the communication network by a communication device, receiving to 203 a network re-selection request over the communication network instructing to re-select another communication network, and re-selecting the other communication network in response to the network re-selection request.

Figure 3:
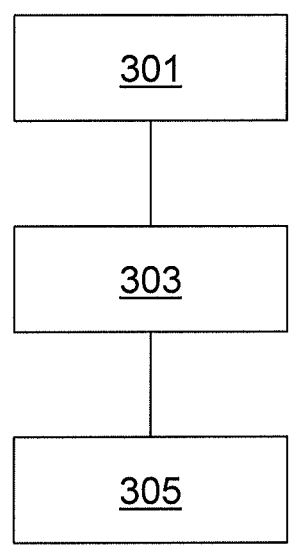
FIG. 3 shows a block diagram of a network selector.

FIG. 3 shows a block diagram of a network selector for selecting a communication network. The network selector comprises a receiver 301 for receiving a network access request indicating a request to access to the communication network by a communication device, and a resource controller 303 for determining upon the basis of the network access as to whether communication resources of the communication network are available for the communication device, and a network controller 305 for re-selecting another communication network for the communication device if the communication resources are not available for the communication device.

Further features of the network re-selector are directly derivable from the features of the method for re-selecting or methods for accessing to a communication network.

Figure 4:
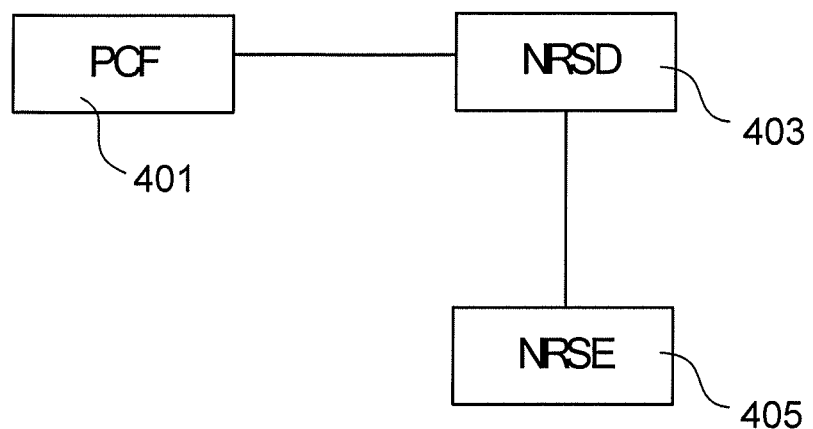
FIG. 4 shows a system architecture.

FIG. 4 shows a systems architecture comprising a Policy Control Function (PCF) 401, a Network Re-Selection Decision Function (NRSD) 403, and a Network Re-Selection Execution Function (NRSE) 405.

According to some embodiments, the NRSD 403 may be implemented in the resource controller 303 or in the network controller 305. Correspondingly, the NRSE 405 may be implemented in the resource controller 303 or the network controller 305. Furthermore, the PCF 401 may be implemented in the resource controller 303 or in the network controller 305. With reference to FIG. 4, the functional elements may or may not be located at the same physical element. Furthermore, the functional elements may be implemented in hardware or in Software.

According to some embodiments, the Policy Control Function 401 may be aware that a session is established or released. This function may also be located in the network, e.g. the PCRF of the 3GPP Evolved Packet Core, or may be located in the mobile device.

According to some embodiments, the Network Re-Selection Decision Function 403 may make makes the decision on access network reselection. This function may be also located in the network, e.g. ANDSF of the 3GPP Evolved Packet Core, or may be located in the mobile device.

According to some embodiments, the Network Re-Selection Execution Function 405 may execute the re-selection procedure taking into account the decision of the NRSD 403. This function may be located in the network, in the network and in the mobile device or only in the mobile device, e.g. the UE of the 3GPP.

Using the architecture depicted in FIG. 4, the following method for access network re-selection based on session establishment or release information may be performed:

The PCF 401 may require knowledge of a session establishment or release, i.e. a change in the required resources. Based on results of specific operations such as local policies which apply for the user or mobile device or session which is to be established or released. The specific operations can be operations of reserving or releasing resources for the session, aggregation of sessions, mobile device or user of the mobile device. The PCF 401 sends an indication or request to the NRSD 403 for network re-selection. Upon receiving the indication, the NRSD 403 may make a re-selection decision and may select the target access network if the re-selection is decided. If a re-selection was decided by the NRSD 403, then a network re-selection indication may be sent to the NRSE 405. The NRSE 405 may execute the re-selection as indicated by the NRSD 403.

According to some implementations, the indication transmitted by the PCF 401 to the NRSD 403 may contain information on the requirements of the session that is to be established or released.

According to some implementations, the indication transmitted by the PCF 401 to the NRSD 403 may contain information on the requirements of all the sessions of the mobile device including the session that is to be established or released.

According to some implementations, the indication transmitted by the PCF 401 to the NRSD 403 may contain information on the mobile device or on the user of the mobile device.

According to some implementations, the decision of the NRSD 403 may be based on the momentary parameters of the access networks and of the core network.

According to some implementations, the decision of the NRSD 403 may be based on the profile of the user of the mobile device and/or the capabilities of the mobile device and/or the static and/or dynamic parameters of the access networks.

According to some implementations, the decision of the NRSD 403 may be based on the location of the mobile device.

According to some implementations, the decision of the NRSD 403 may be based on the coverage information of the access networks.

Figure 5:
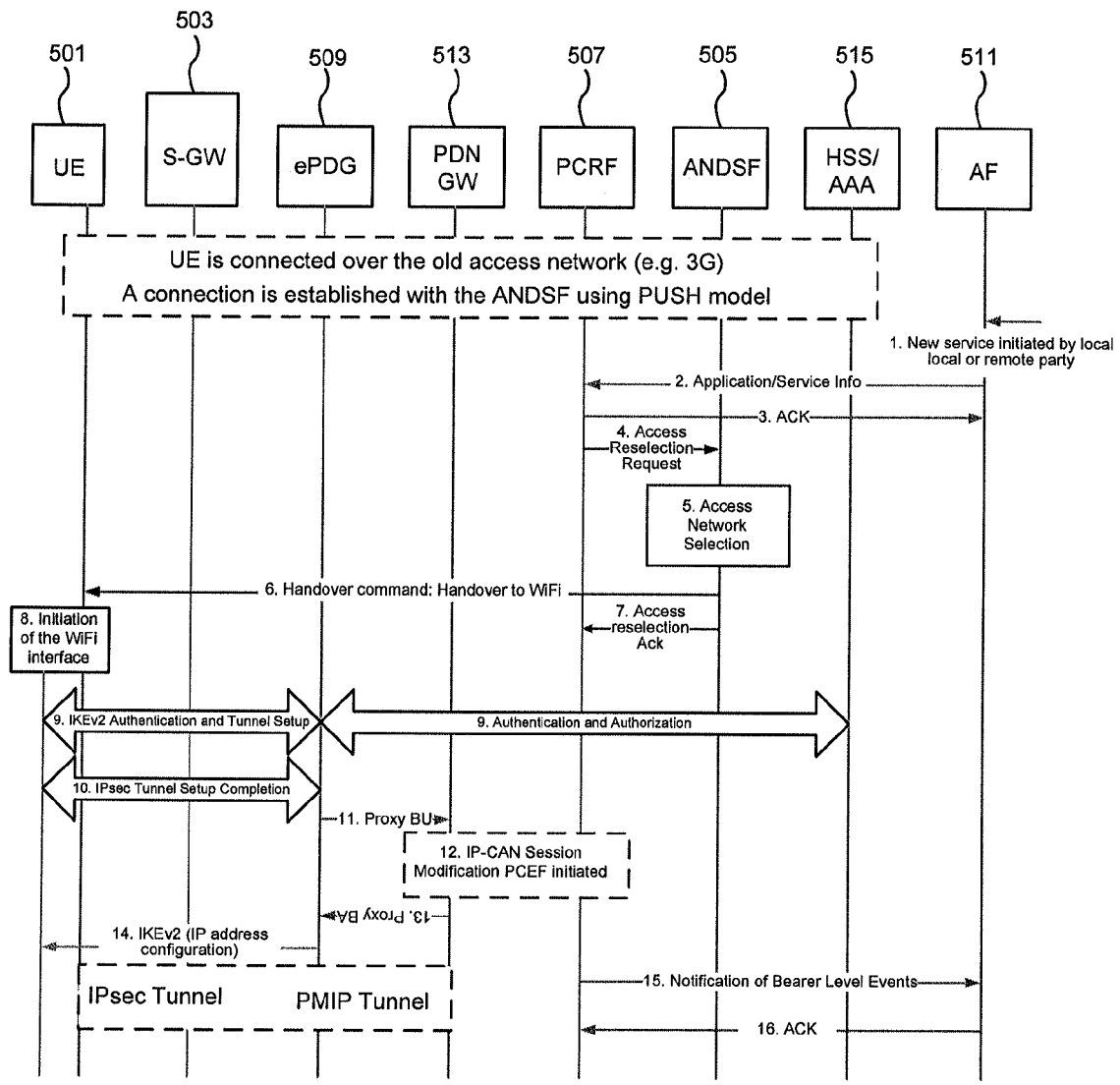
FIG. 5 shows a session establishment.
Figure 6:
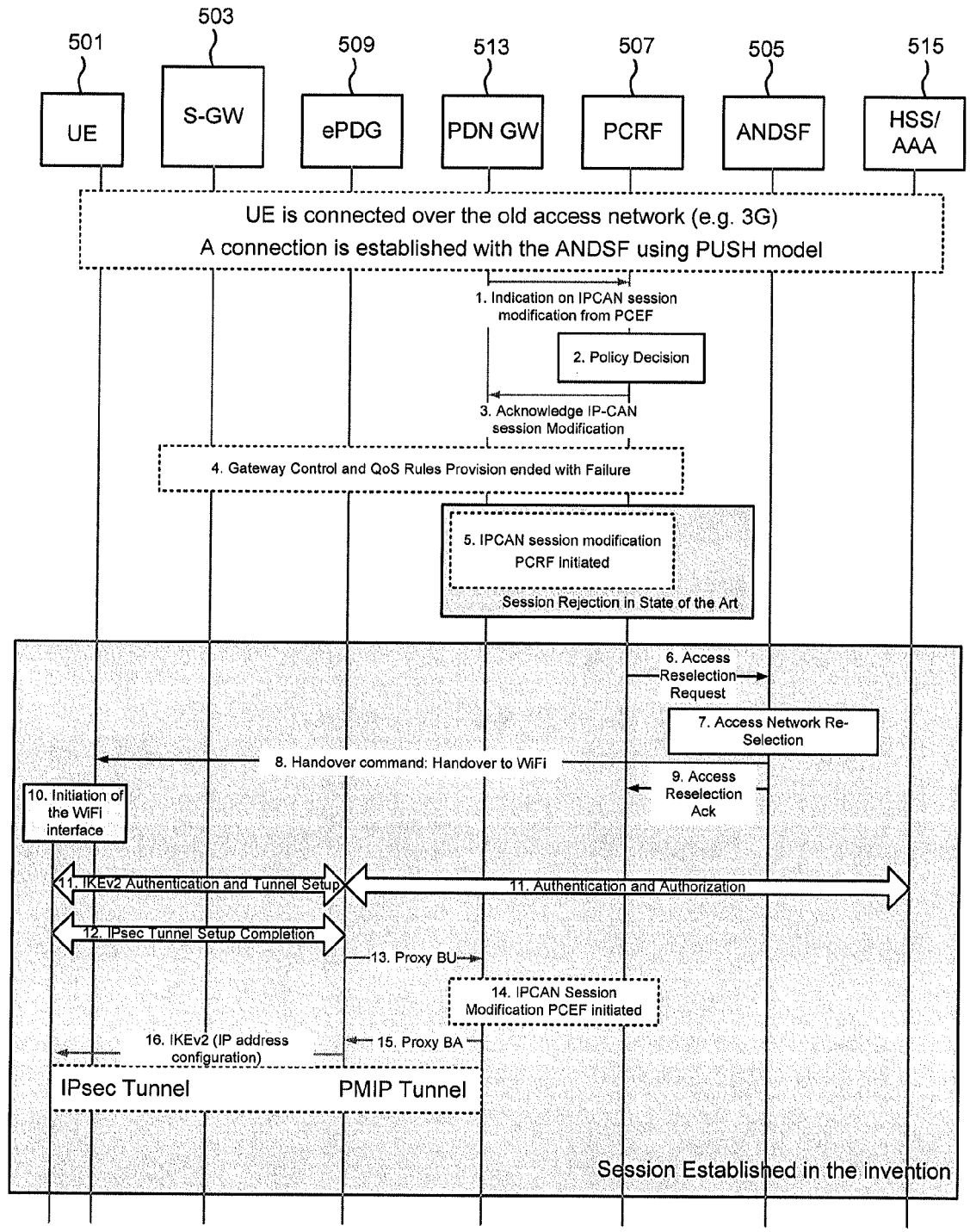
FIG. 6 shows a session establishment.
Figure 7:
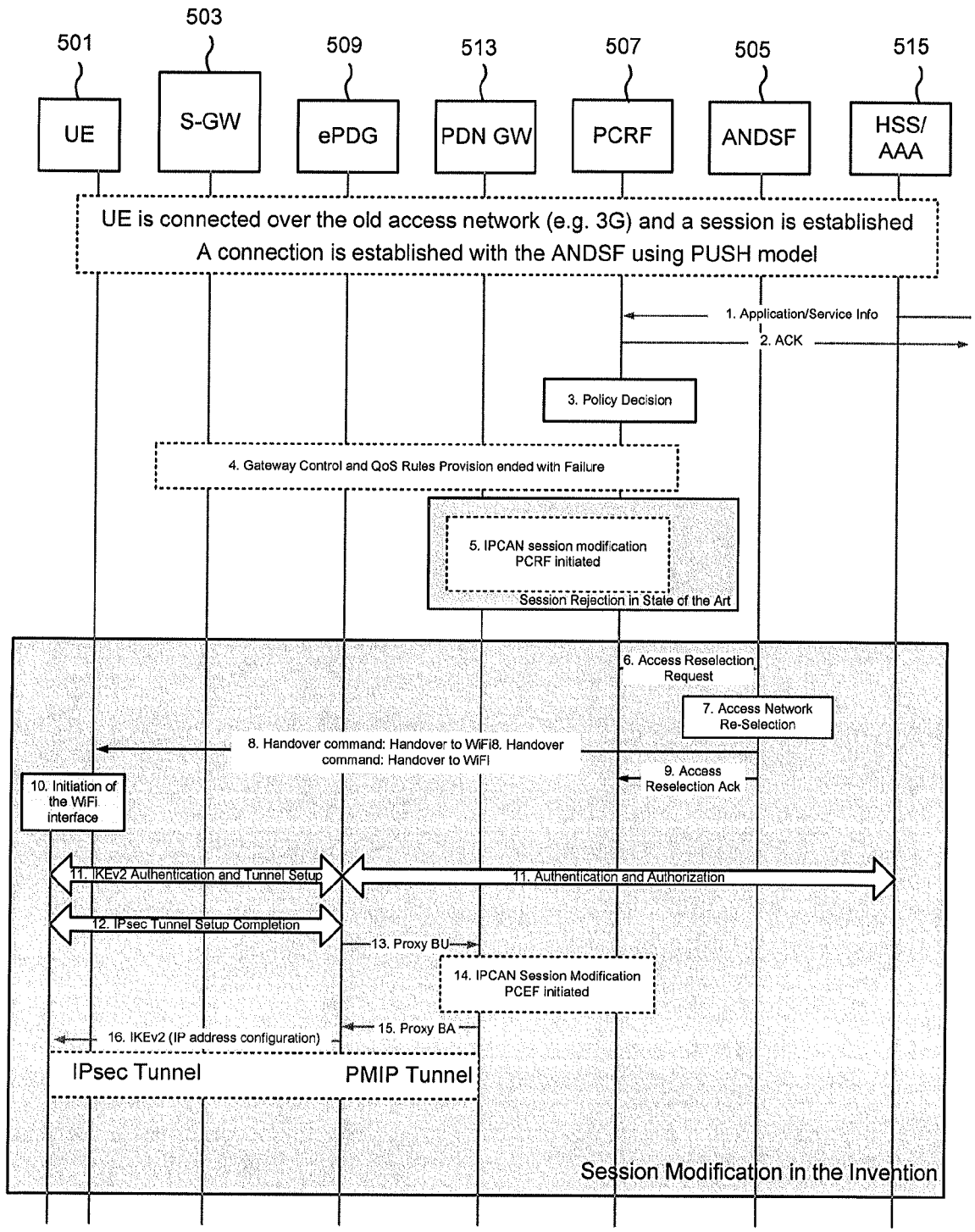
FIG. 7 shows a session establishment.
Figure 8:
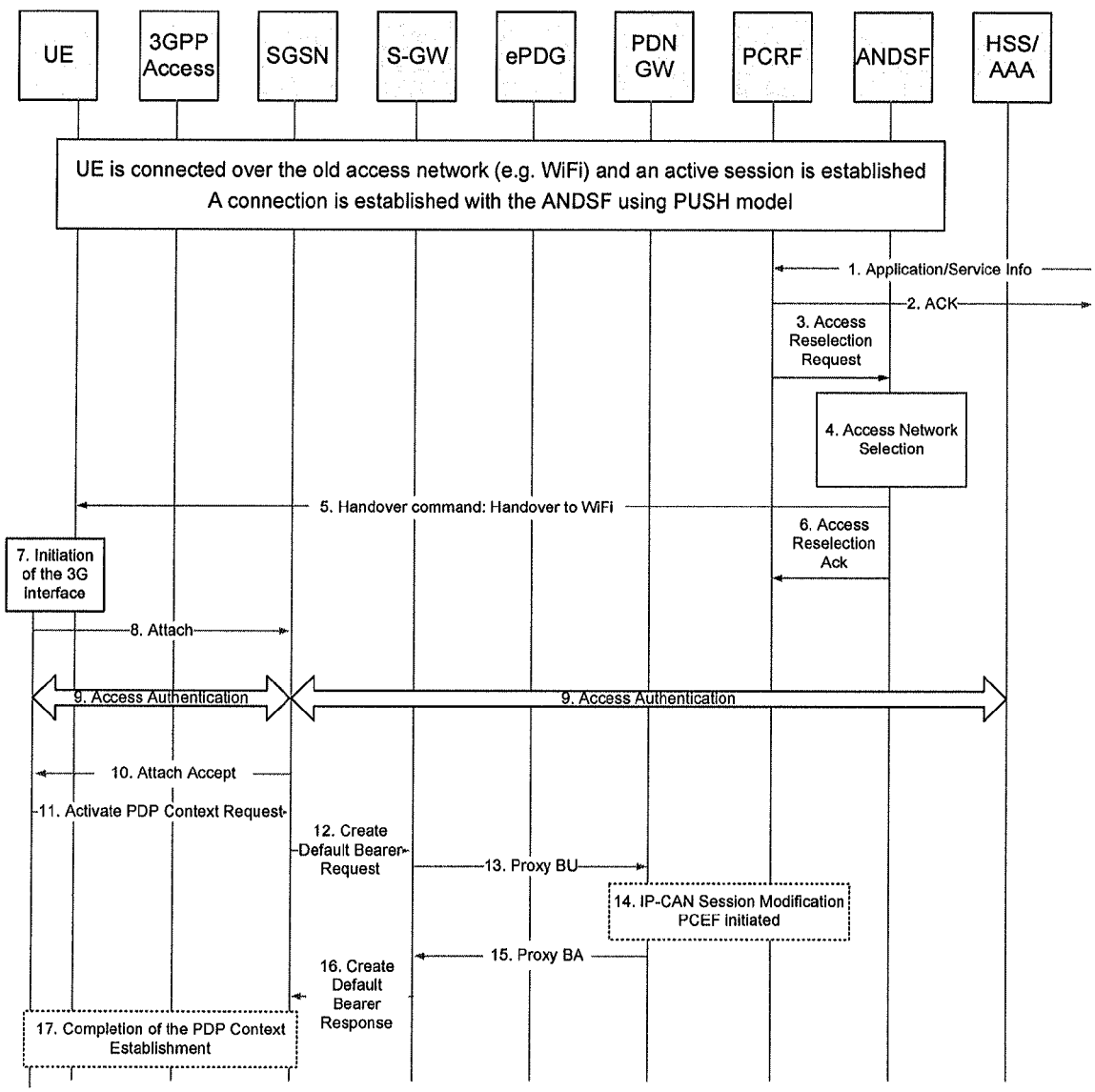
FIG. 8 shows a session establishment.
Figure 9:
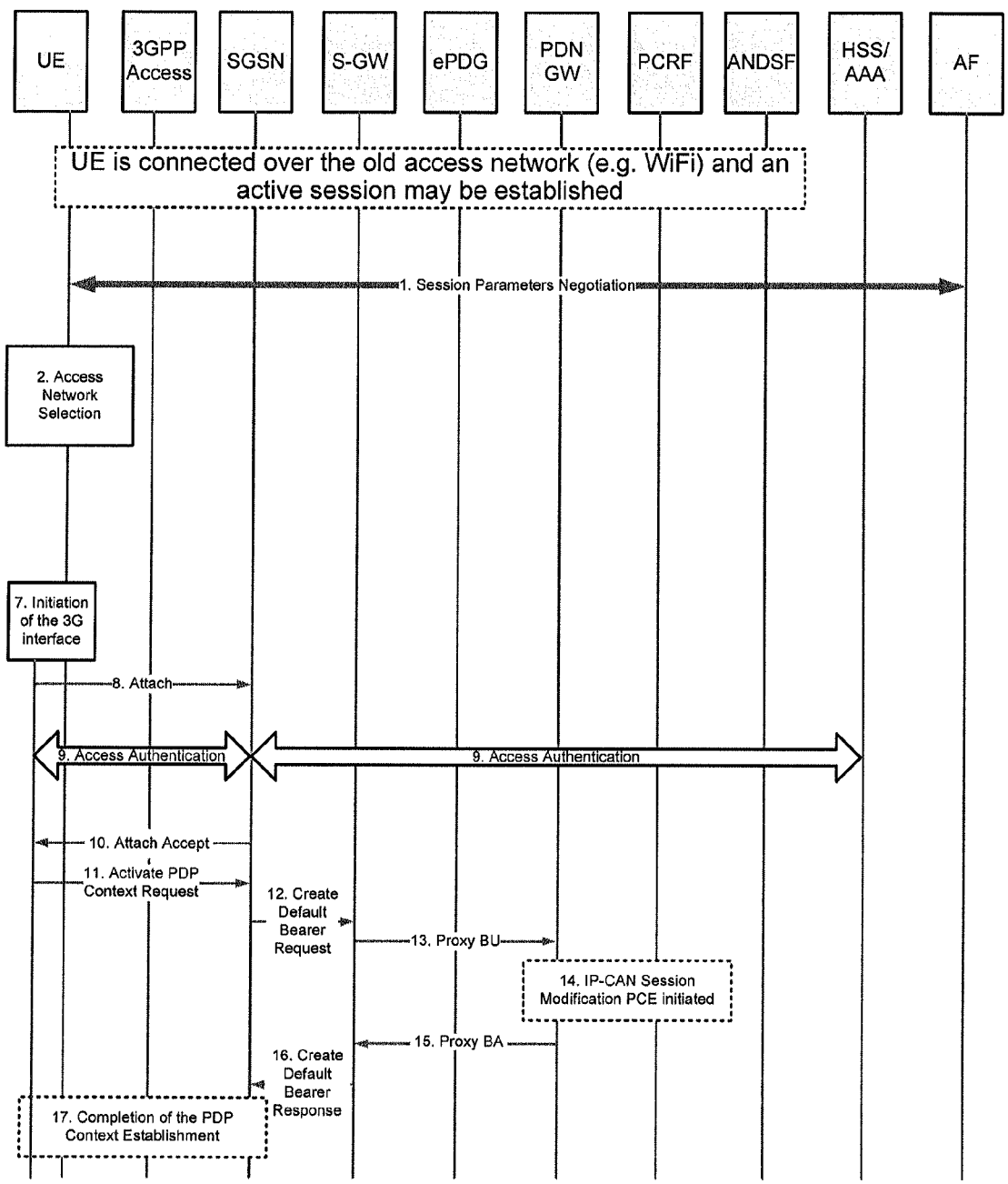
FIG. 9 shows a session establishment.
Figure 10:
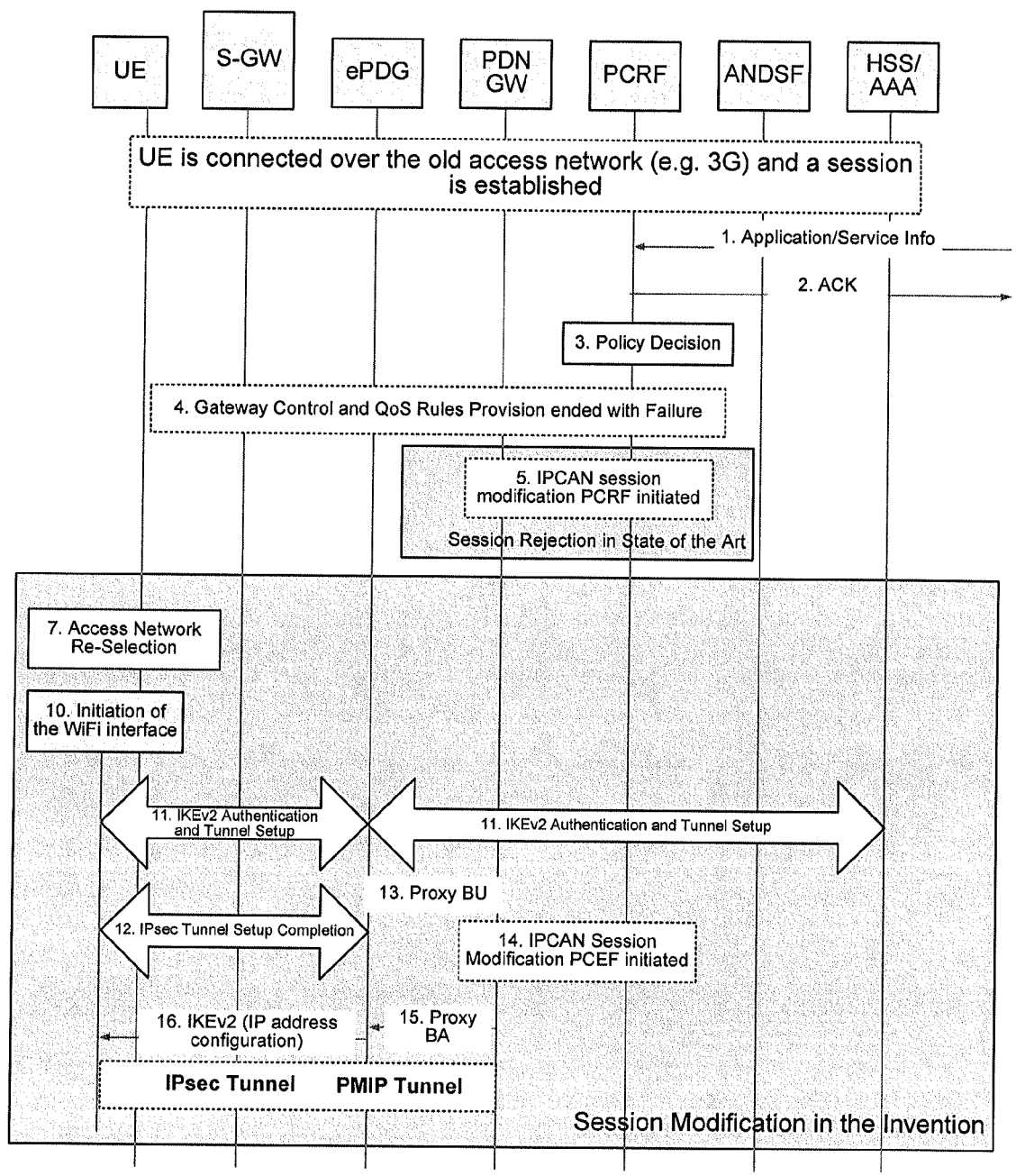
FIG. 10 shows a session establishment.

In the following, exemplarily implementations in the 3GPP Evolved Packet Core architecture are described. It is, however, to be understood, that these implementations may correspondingly be implemented in other architectures:

With respect to the network re-selection during session establishment, FIG. 5 shows triggering the network re-selection by default, FIG. 6 shows triggering the network re-selection when resource reservation fails, FIG. 7 shows the network re-selection during session modification, FIG. 8 shows the network re-selection during session release, FIG. 9 shows the network re-selection during session modification decided by the UE (User Endpoint), i.e. the mobile communication device, and FIG. 10 shows the network re-selection during session modification decided by the User Endpoint (UE) due to resource reservation failure.

In the following, by way of example, the following setup is considered: The mobility protocol selected is Proxy Mobile IPv6 (PMIPv6). A mobile device 501, denominated as UE conformant to the 3GPP specifications, is connected to a 3G network, through a SGSN and a Serving Gateway (S-GVV) 503, wherein, by way of example, only the S-GW 503 is depicted. A PMIPv6 tunnel may be established between the S-GW 503 and the Packet Data Network Gateway (PDN GW). A connection over the 3G network is established with the Access Network Discovery and Selection Function (ANDSF) 505 using the PUSH mode. The resource reservation is controlled by a Policy and Charging Rules Function (PCRF) 507. Multiple WiFi accesses are available in the area where the UE 501 is located. To connect using the EPC to the network, an extended Packet Data Gateway (ePDG) 509 is deployed. The preference of the operator at the beginning of each of the example scenarios is to maintain the UE 501 camped in the 3G network. During the procedures exemplified here the preference of the operator changes and the ANDSF makes the decision to hand over the UE 501 to one of the WiFi networks available. Only that WiFi access network is depicted. Furthermore, an Application Function (AF) 511, a PDN GW 513 and a HSS/AAA 515 are provided.

With reference to FIG. 5, the procedures for session establishment may be initiated for a session in which the UE 501 is either the originating or the terminating party.

In step 1, a new service may be initiated by the local or the remote party, wherein the information may be received by the AF 511.

In step 2, an Application/Service information may be transmitted to the PCRF 507 containing the information on the resources required by the UE 501 according to 3GPP TS 23.203. At this moment, the PCRF 507 is aware that a new session is to be initiated and of the parameters of this new session.

In step 3, the information may further be acknowledged to the AF 511.

The above steps 1 to 3 introduce the scenario where the PCRF 507 received the session request from AF 511. However, it is also available if UE 501 initiated the resource request and release procedure as described in 3GPP TS 23.401 and 23.402, where the PCRF 507 received the request QoS Parameters from the PGW.

In step 4, an Access Reselection Request, i.e. a Network Re-Selection Request, may be sent by the PCRF 507 to the ANDSF 505. This message may contain the information on the QoS parameters, e.g. bandwidth or QCI, required by the new session that is to be established. Optionally, it may contain information on the already established sessions of the UE 501, information which is available in the PCRF 507.

In step 5, the ANDSF 505 may make the decision according to the information received from the PCRF 507. Optionally, other input parameters may be considered for the decision, e.g. the location of the UE 501, the load of the access networks located in the area of the UE 501 etc. In this embodiment, the decision may comprise the following: whether a re-selection is necessary—the preferences of the operator for the UE 501 change due to the new session—and if the reselection is necessary, which access network should the UE 501 re-select. It is considered in this example by way of example that the re-selection is necessary, e.g. because the 3G network can not sustain the session or the 3G network is loaded and that a WiFi access network is preferred by the operator to sustain the session of the UE 501.

In step 6, the decision may be transmitted in the form of inter-system mobility policies to the UE 501 according to 3GPP TS 24.302. The re-selection indication, i.e. request, may further presume an immediate execution from the UE 501.

In optional step 7, an or the indication of the re-selection can be transmitted to the PCRF 507 as not to initiate the resource reservation on the 3G network and to wait until the UE 501 connects to the WiFi access network for this operation.

In step 8, based on the re-selection indication received from the ANDSF 505, the UE 501 initiates the re-selection procedures to the WiFi access network. It initiates the device interface for WiFi access network.

In step 9, the authentication and authorization procedures may be executed according to 3GPP TS 23.402

In step 10, the IP-Sec tunnel establishment procedures between the UE and the ePDG are initiated according to 3GPP TS 23.402.

In step 11, a Proxy Binding Update (PBU) may be send by the ePDG 509 to the PDN GW 513 according to 3GPP TS 23.402 as to establish the mobility path to the new access network.

In step 12, PDN GW 513 may initiate a IP-CAN bearer establishment procedure as to reserve the resources according to the policies of the PCRF 507 for the WiFi connectivity of the UE 501 according to 3GPP TS 23.402 and 23.203.

In step 13, a Proxy Binding Acknowledgement (PBA) may be send by the PDN GW 513 to the ePDG 509. A communication tunnel is established between the ePDG 509 and the PDN GW 513.

In step 14, an IP address may be configured in the UE 501.

In step 15, a notification on a bearer modification may then be sent by the PCRF 507 to the AF 511 to indicate that the session can be established in the conditions decided by the PCRF 507 upon initiating the IP-CAN bearer establishment procedure as described above. The AF 511 may initiate the session according the negotiated profile between the UE 501 and the correspondent parties upon initiating the new service as described above, and having the resources reserved on the WiFi access network.

In step 16, the notification may be acknowledged by the AF 511.

With reference to FIG. 6, the procedure for session establishment may be initiated for a session in which the UE 501 is either the originating or the terminating party.

In step 1, because of the new session establishment procedure, an indication on IP-CAN session modification may be received by the PCRF 507 from the PDN GW 513 according to 3GPP TS 23.401, TS 23.402 and TS 23.203. This indication is received if the UE 501 has initiated a resource reservation request. The same method as in the previous embodiment can be also deployed with AF 511 sending application information to the PCRF 507.

In step 2, the PCRF 507 makes a policy decision on the new session which is to be established according to TS 23.203.

In step 3, the IP-CAN session modification is acknowledged to the PDN GW 513 according to 3GPP TS 23.401, TS 23.402 and TS 23.203.

In step 4, a Gateway Control and QoS Provisioning Procedure may be executed in order to reserve resources in the 3G access network according to TS 23.401 and TS 23.203. It is assumed in this embodiment that the resources required by the new session can not be reserved and the procedure ends with failure.

In step 5, according to TS 23.401, TS 23.402 and TS 23.203, an IP-CAN session modification, initiated by the PCRF 507, is executed because of the failure of the Gateway Control and QoS Provisioning Procedure. The session is released because the 3G access network can not reserve the required resources.

In step 6, an Access Reselection Request is sent by the PCRF 507 to the ANDSF 505. This new message of this present disclosure contains the information on the QoS parameters required by the new session that is to be established. Optionally it may contain information on the already established sessions of the UE, information which is available in the PCRF 507.

In step 7, the ANDSF 505 makes a decision according to the information received from the PCRF 507. Other input parameters may be considered for the decision, e.g. the location of the UE 501, the load of the access networks located in the area of the UE 501 etc. In this example the decision consists on the selecting an access network which to be re-selected by the UE 501 because the re-selection is necessary as the 3G network can not sustain the new session. It is considered that a WiFi access network is preferred by the operator to sustain the session of the UE 501.

In step 8, the decision is transmitted in the form of inter-system mobility policies to the UE 501 according to 3GPP TS 24.302. The re-selection indication is new to the present disclosure and presumes an immediate execution from the UE 501.

In step 9, optionally, an indication of the re-selection can be transmitted to the PCRF 507 as not to initiate the resource reservation on the 3G network and to wait until the UE 501 connects to the WiFi access network for this operation.

In step 10, based on the re-selection indication received from the ANDSF 505, the UE 501 initiates the re-selection procedures to the WiFi access network. It initiates the device interface for WiFi access network.

In step 11, the authentication and authorization procedures are executed according to 3GPP TS 23.402

In step 12, the IP-Sec tunnel establishment procedures between the UE 501 and the ePDG 509 are initiated according to 3GPP TS 23.402.

In step 13, a Proxy Binding Update (PBU) is send by the ePDG 509 to the PDN GW 513 according to 3GPP TS 23.402 as to establish the mobility path to the new access network.

In step 14, the PDN GW 513 initiates a IP-CAN bearer establishment procedure as to reserve the resources according to the policies of the PCRF 507 for the WiFi connectivity of the UE 501 according to 3GPP TS 23.402 and 23.203.

In step 15, a Proxy Binding Acknowledgement (PBA) is send by the PDN GW 513 to the ePDG 509. A communication tunnel is established between the ePDG 509 and the PDN GW 513.

In step 16, the IP address is configured in the UE 501.

By way of example, the steps 8 to 16 correspond to the steps 6 to 14 in FIG. 5.

With reference to FIG. 7, the procedures for session modification are initiated for a session in which the UE 501 is either the originating or the terminating party. Here, the two previous cases can be presented. By way of example, only the case in which resources can not be reserved on the 3G access is described.

In step 1, an Application/Service information is transmitted to the PCRF 507 by the AF 511 containing the information on the resources required by the UE 501 after the modification of the active session according to 3GPP TS 23.203. At this moment the PCRF 507 is aware that the active session is to be modified and of the parameters after modification.

In step 2, the information is acknowledged to the AF 511.

In step 3, the PCRF 507 makes a policy decision on the modification of the active session according to TS 23.203.

In step 4, a Gateway Control and QoS Provisioning Procedure is executed in order to reserve resources in the 3G access network to the levels indicated by the modification parameters received from the AF 511 according to TS 23.401 and TS 23.203. It is assumed in this embodiment that the resources required by the modification of the session can not be reserved and the procedure ends with failure.

In step 5, e.g. according to TS 23.401, TS 23.402 and TS 23.203, an IP-CAN session modification, initiated by the PCRF 507, is executed because of the failure of the Gateway Control and QoS Provisioning Procedure. The session is remaining as it was established in the initial phase. The modification fails.

In step 6, an Access Reselection Request is sent by the PCRF 507 to the ANDSF 505. This new message of the present disclosure contains the information on the modified QoS parameters for the session. Optionally it may contain information on the already established sessions of the UE 501, information which is available in the PCRF 507.

In step 7, the ANDSF 505 makes a decision according to the information received from the PCRF 507. Other input parameters may be considered for the decision, e.g. the location of the UE 501, the load of the access networks located in the area of the UE etc. In this embodiment, the decision consists on the selecting an access network which to be re-selected by the UE 501 because the re-selection may be necessary as the 3G network can not sustain the modified session. It is considered that a WiFi access network is preferred by the operator to sustain the session of the UE 501.

In step 8, the decision is transmitted in the form of inter-system mobility policies to the UE 501 according to 3GPP TS 24.302. The re-selection indication is new to the present disclosure and presumes an immediate execution from the UE 501.

In step 9, optionally, an indication of the re-selection can be transmitted to the PCRF 507 as not to initiate the modification of the resource reservation on the 3G network and to wait until the UE 501 connects to the WiFi access network for this operation.

In step 10, based on the re-selection indication received from the ANDSF 507, the UE 501 initiates the re-selection procedures to the WiFi access network. It initiates the device interface for WiFi access network.

In step 11, the authentication and authorization procedures are executed according to 3GPP TS 23.402.

In step 12, the IP-Sec tunnel establishment procedures between the UE 501 and the ePDG 509 are initiated according to 3GPP TS 23.402.

In step 13, a Proxy Binding Update (PBU) is send by the ePDG 509 to the PDN GW 513 according to 3GPP TS 23.402 as to establish the mobility path to the new access network.

In step 14, the PDN GW 513 initiates a IP-CAN bearer establishment procedure as to reserve the resources according to the policies of the PCRF 507 for the WiFi connectivity of the UE 501 according to 3GPP TS 23.402 and 23.203.

In step 15, a Proxy Binding Acknowledgement (PBA) is send by the PDN GW to the ePDG. A communication tunnel is established between the ePDG 509 and the PDN GW 513.

In step 16, the IP address is configured in the UE 501. The UE 501 had handed over to the WiFi access network and the session is modified according to the message in Step 1.

Steps 4 to step 16 of this procedure are similar as procedures with the steps 4 to step 16 in FIG. 6

With reference to FIG. 8, the procedures for session release are initiated for a session in which the UE 501 is either the originating or the terminating party. Here only the case in which the PCRF 507 informs the ANDSF 505 on all the sessions can be applied. In this embodiment, the session was established over the WiFi access network. During the release of the session, the ANDSF 505 makes the decision to re-select the 3G access network for the UE 501. According to the embodiment of FIG. 8, a SGSN 801 and 3GPP Access 803 are provided.

In step 1, an Application/Service information is transmitted to the PCRF 507 by the AF 511 containing the information on the session that it is released according to 3GPP TS 23.203. At this moment the PCRF 507 is aware that the active session is to be released.

In step 2, the information is acknowledged to the AF 511.

In step 3, an Access Reselection Request is sent by the PCRF 507 to the ANDSF 505. This new message of this present disclosure contains the information on the session which is to be released. As an extension, optionally it may contain information on the already established sessions of the UE 501, information which is available in the PCRF 507.

In step 4, the ANDSF 505 makes a decision according to the information received from the PCRF 507. Other input parameters may be considered for the decision, e.g. the location of the UE 501, the load of the access networks located in the area of the UE 501 etc. In this example the decision consists on the following: whether a re-selection is necessary—the preferences of the operator for the UE 501 change due to the release of a session—and if the re-selection is necessary, which access network should the UE 501 re-select. It is considered in this embodiment that the re-selection is necessary, e.g. because the connectivity to the WiFi is unreliable or because a UE 501 without any active sessions can be camped in Idle mode in the 3G network.

In step 5, the decision is transmitted in the form of inter-system mobility policies to the UE 501 according to 3GPP TS 24.302. The re-selection indication is new to the present disclosure and presumes an immediate execution from the UE 501.

In step 6, optionally, an indication of the re-selection can be transmitted to the PCRF 507 as not make it aware of the handover that is to be executed.

In step 7, based on the re-selection indication received from the ANDSF 505, the UE 501 initiates the re-selection procedures to the 3G access network. It initiates the device interface for the 3G access network.

In step 8, the 3GPP access system is discovered by the UE 501 and initiates the attachment to it by sending an attach request to the SGSN 801.

In step 9, the authentication procedure through the SGSN 801 is executed if necessary.

In step 10, the SGSN 801 sends the Attach Accept request to the UE to indicate the completion of the attach procedure.

In step 11, the UE 501 initiates the procedure for the establishment of the primary PDP context.

In step 12, the SGSN 801 selects a S-GW 503 and sends a Create Default Bearer Request.

In step 13, a Proxy Binding Update (PBU) is send by the S-GW 513 to the PDN GW 513 according to 3GPP TS 23.402 as to establish the mobility path to the new access network.

In step 14, the PDN GW 513 initiates a IP-CAN bearer establishment procedure as to reserve the resources according to the policies of the PCRF 507 for the 3G connectivity of the UE 501 according to 3GPP TS 23.402 and 23.203.

In step 15, a Proxy Binding Acknowledgement (PBA) is send by the PDN GW 513 to the S-GW 503. A communication tunnel is established between the S-GW 503 and the PDN GW 513.

In step 16, the Serving GW 503 returns a Create Default Bearer Response message to the SGSN 801. This message also includes the IP address of the UE.

In step 17, the PDP Context establishment is completed for the UE 501.

In the case the session that was released was the last session of the UE 501, the UE 501 may enter in Idle state which reduces the power consumption of the mobile device and the costs of the operator for the UE 501. Also because of the Routing Area and Paging mechanism it may be still reachable without requiring handovers to other access networks in a large area, i.e. the coverage area of the 3G network which is assumed to be larger than the coverage are of the WiFi access network.

According to some implementations, the procedures for Network re-selection may be decided by the UE 501 during session updating.

In step 1, an Application/Service information is transmitted to the PCRF 507 by the AF 511 comprising the information on the resources required according to 3GPP TS 23.203. It can be performed during session establishment, modification and release. At this moment, the PCRF 507 is aware that the active session is to be updated and of the parameters after updated.

In step 2, an access Reselection Request is sent by the PCRF 507 to the ANDSF 505. This message may comprise the information on the updated QoS parameters for the session, e.g. the bandwidth and QCI information.

In step 3, an access Reselection Request is sent by the ANDSF 505 to the UE 501. This message may comprise the information on the updated QoS parameters for the session, e.g. the bandwidth and QCI information.

In step 4, the UE 501 makes a decision according to the information received from the ANDSF. If the re-selection is necessary, UE make a decision which access network should the UE re-select.

It shall be noted that all services may be signaled services. Preferably, in order to enable that the parameters of a service are modified a signaling between parties may exist. No service modifies its parameters without a negotiation end-to-end in our case between the UE 501 and the AF 511. Therefore, it can be presumed that, when a service changes its QoS parameters, the UE 501 will be informed by the mechanism of signaling of the session, e.g. http, sip. Therefore, there is no need of putting the ANDSF 505 in the path. The UE 501 making by itself a reselection decision based on the new parameters and using the inter-system mobility policies may be a better solution.

With reference to FIG. 9, a network re-selection during session modification decided by the UE 501. This procedure considers that the access network reselection function is located in the UE 501. When the parameters of a session are modified, due to the various factors which may include a communication with the AF 511, the UE 501 makes the reselection decision. In this embodiment, the NRSD 403 and the NRSE 405 are located on the UE 501 while the PCF 401 is split between the UE 501 and the AF 511. In this embodiment, the UE 501 is connected over the WiFi access network. An active session may have been established or is to be established.

In step 1, the UE 501 and the AF 511 negotiate the parameters of the active session. In case the session is to be established, then the initial QoS parameters are negotiated. In case the session is to be modified, then the modified QoS parameters are negotiated. In case the session is to be released, then the termination of the session is signaled. The QoS parameters negotiated for the termination case can be considered as zero resources required. In this scenario the PCF 401 role is taken by the negotiation between the UE 501 and the AF 511. No interaction with the PCC of the EPC is considered.

In step 2, based on the information received on the inter-system mobility policies from the ANDSF 505 and on some other information, the UE 501 makes the decision because of the new QoS parameters to reselect the access network to which it is attached to. In this example, the ANDSF 505 is located on the UE 501. The decision of reselection is taken by the UE 501 based on different factors which may include and are not limited to the inter-system mobility policies received from the ANDSF 505.

In step 3, the UE 501 enforces the re-selection decision taken at step 2, in this example by initiating the 3G interface.

Further steps may correspond to the attachment procedure to the 3G network as described with reference to FIG. 8.

With reference to FIG. 10, a network re-selection during session modification may be decided by the UE 501 due to resource reservation failure. This procedure considers that the access network reselection function is located in the UE 501. When the parameters of a session are modified, due to the various factors the resources required by the modification can not be anymore sustained by the access network to which the UE 501 is attached to. The session is released and the UE 501 makes a reselection decision. After the reselection decision the session is re-established over the target access network. In this example the NRSD 403 and the NRSE 405 are located on the UE 501 while the PCF 401 functionality is maintained by the PCC entities.

This embodiment considers that the UE 501 is connected to a 3G access network over which a session is to be established or is established. Due to a negotiation or re-negotiation of the QoS parameters, the PCRF 507 has to reserve the new required resources.

In step 1, an Application/Service information is transmitted to the PCRF 507 by the AF 511 containing the information on the resources required by the UE 501 after the modification of the active session according to 3GPP TS 23.203. At this moment, the PCRF 507 is aware that the active session is to be modified and of the parameters after modification.

In step 2, the information is acknowledged to the AF 511.

In step 3, the PCRF 507 makes a policy decision on the modification of the active session according to TS 23.203.

In step 4, a Gateway Control and QoS Provisioning Procedure is executed in order to reserve resources in the 3G access network to the levels indicated by the modification parameters received from the AF according to TS 23.401 and TS 23.203. It is assumed in this embodiment that the resources required by the modification of the session can not be reserved and the procedure ends with failure.

In step 5, e.g. according to TS 23.401, TS 23.402 and TS 23.203, an IP-CAN session modification, initiated by the PCRF 507, is executed because of the failure of the Gateway Control and QoS Provisioning Procedure. The session is remaining as it was established in the initial phase if established. The modification fails.

In step 6, the UE 501 is notified that the session can not be established with the new parameters. Based on the information received on the inter-system mobility policies from the ANDSF 505 and on some other information the UE 501 makes the decision because of the new QoS parameters to reselect the access network to which it is attached to. In this example, the ANDSF 505 is located on the UE 501. The decision of reselection is taken by the UE 501 based on different factors which may include and are not limited to the inter-system mobility policies received from the ANDSF 505.

In step 7, the UE 501 enforces the re-selection decision taken at step 2, e.g. by initiating the 3G interface. The attachment procedure to the WiFi access is executed as described with reference to FIG. 7.

According to some implementations, it may be considered that more than one access network is available at the location of the mobile device. Considering this hypothesis, the resources for the services that are to be established may be reserved over another access network available at the location of the mobile device, case which is not considered in the current state of the art.

According to some implementations, the 3GPP Evolved Packet Core and targets the reference point between the ANDSF 505 and the PCRF 507 may be addressed. Furthermore, a functionality in the ANDSF 505 may be introduced in order to ensure session survivability for a larger space than the existing procedures by executing handovers to access networks during UE 501 required resources modification either by session establishment, release or modification.

According to some implementations, the functionality of the PCRF 507 is extended which is able after the present disclosure to reserve the resources required not only on the access network to which the UE 501 is connected to, but also to the access networks to which the UE 501 may be able to connect, extending the access network capacity available for the UEs.

According to some implementations, the functionality of the ANDSF 505 may be extended. After the present disclosure the ANDSF 505 is able to make network selection decisions based on the required resources by the mobile devices. Using these parameters, the ANDSF 505 is able not only to ensure attachment survivability, but also to ensure resource reservation survivability over multiple accesses.

According to some implementations, the methods may be completely automatically performed without involving involve any interaction with the user of the UE 501 on access network re-selection.

According to some implementations, the ANDSF 505 is able to select the operator preferred access network for the UE 501 on which it can successfully establish or maintain a modified session, the requested session remains transparent to the user of the mobile device and more important, the session is not consuming resources on the source access network. The resources are reserved only on the target access network on which the operator prefers to maintain the session.

According to some implementations, the network re-selection approach can be used in heterogeneous access network scenarios independent of which are the source and the target access network technologies.

According to some implementations, an operator may be enabled to balance the different mobile devices between the different accesses according to their momentary required resources. As the EPC bases on guaranteed resources which are reserved during session establishment or modification and released during session release, there is no need of introducing any other mechanism for balancing the mobile devices between the different accesses.

According to some implementations, handovers between heterogeneous access networks may be performed, by this referring to the network reselection between different types of access networks, as part of a session establishment or release procedure which enables an optimized usage of the access network resources according to the requirements of the mobile device which is part of the session that is to be established, modified or is to be released and the momentary context of the access networks to which the mobile device is able to connect to.

Some implementations address without restrictions a single operator scenario in which the mobile device is connected to a core network, which core network is able to offer to the mobile device connectivity over more than one access network of more than one type.

Some implementations address without restrictions a mobile devices which have one or more device interfaces through which they are able to connect to the more than one access networks offered by the core network.

According to some implementations, a method for access network reselection as part of the session establishment modification or release procedures is provided. The method addresses the cases in which the preferences of the operator and of the user of the mobile device are changed due to the session that is to be updated.

According to some implementations, an architecture is provided which enables the access network reselection as part of the session establishment or release procedures conformant to the proposed method. The architecture may be based on but not limited to the 3GPP Evolved Packet Core (EPC) standardized by 3GPP.

According to some implementations, a method and system for access network reselection is provided when the required resources of a mobile device change due to a session establishment or release, by introducing a new reference point between the policy control function for resource reservation which is in charge of reserving or releasing the resources required by the mobile device and the network re-selection decision function. A re-selection of the access network to which the mobile device is attached to is triggered and can be executed due to the modification of the requirements in resources of the mobile device, information which is available at the policy control function. On session establishment the PCC may start the resource authorization and reservation procedures According to some implementations, if the UE 501 is not authorized to reserve resources, e.g. if not enough resources are available on the access network to which the UE 501 is connected to, then the PCC transmits to the ANDSF 505 a request for re-selection. The ANDSF 505 decides if an access re-selection is possible and to which access network to hand over the UE 501. The decision is transmitted to the UE 501 as a handover request. The UE 501 executes immediately the handover procedures from the handover request received.

The particular combinations of elements and features in the above detailed embodiments are exemplary only; the interchanging and substitution of these embodiments with other embodiments disclosed herein are also expressly contemplated. As those skilled in the art will recognize, variations, modifications, and other implementations of what is described herein can occur to those of ordinary skill in the art without departing from the spirit and the scope of the present disclosure as claimed. Accordingly, the foregoing description is by way of example only and is not intended as limiting. The invention's scope is defined in the following claims and the equivalents thereto. Furthermore, reference signs used in the description and claims do not limit the scope of the present disclosure as claimed.

We claim:

1. A method for re-selecting a second communication network, comprising:
    establishing a session between a first communication network and a communication device;
    receiving by a Policy and Charging Rules Function (PCRF) server, a network access request from the communication device, the network access request indicating a request to modify a parameter of the session established with the first communication network by the communication device;
    based on the network access request, determining by the PCRF server, a policy decision on the modified parameter of the session;
    sending by the PCRF server, an Access Reselection Request to an Access Network Discovery and Selection Function (ANDSF) server with information on the modified parameter for the session;
    determining by the ANDSF server according to the Access Reselection Request from the PCRF, whether communication resources of the first communication network are available for modifying the parameter of the session established with the communication device;
    in response to determining by the ANDSF server that communication resources are not available, sending by the ANDSF server, a handover command to the communication device; and
    re-selecting by the communication device, the second communication network according to the received handover command.

2. The method according to claim 1, wherein determining that the communication resources are not available for the communication device is in response to determining that:
    the communication resources provided by the first communication network are not sufficient to support the requested access to the first communication network,
    the communication device is not authorized to access to the communication resources of the first communication network, or
    the communication resources provided by the first communication network cannot be reserved for the first communication device.

3. The method according to claim 1, wherein the re-selection of the second communication network comprises initiating a handover of the communication device to the second communication network.

4. The method according to claim 1, further comprising transmitting a network re-selection request to the communication device or to a network entity comprising a base station to initiate the network re-selection.

5. The method according to claim 1, further comprising transmitting information on the second communication network to the communication device or to a network entity comprising a base station or to any access point.

6. The method according to claim 1, wherein the communication resources comprise at least one of the following:
    a data rate, a bandwidth, a communication channel, a communication frequency, or at least one quality of service parameter.

7. The method according to claim 1, wherein the method is executed if a previous resource reservation has failed, or upon a change of a communication session.

8. A method for accessing a communication network, comprising:
    establishing by a communication device a session with a first communication network;
    transmitting by the communication device to a Policy and Charging Rules Function (PCRF) server, a network access request towards the first communication network to modify a parameter of the session established with the first communication network;
    based on the network access request, determining by the PCRF server, a policy decision on the modified parameter of the session;
    sending by the PCRF server, an Access Reselection Request to an Access Network Discovery and Selection Function (ANDSF) server with information on the modified parameter for the session;

determining by the ANDSF server according to the Access Reselection Request from the PCRF, whether communication resources of the first communication network are available for modifying the parameter of the session established with the communication device;

in response to determining by the ANDSF server that communication resources are not available, sending by the ANDSF server, a handover command to the communication device; and receiving by the communication device, the handover command instructing the communication device to re-select a second communication network, in particular instructing that the communication device be handed-over to the second communication network; and re-selecting by the communication device, the second communication network according to the received handover command.

9. The method according to claim 8, wherein the network access request is transmitted by a policy control function of the communication device or of another network entity.

10. The method according to claim 8, wherein the network re-selection is initiated by a policy control function of the communication device or of another network entity.

11. A network selector, comprising a server performing both Policy and Charging Rules Function (PCRF) and Access Network Discovery and Selection Function (ANDSF), the server further comprises:

a receiver configured to receive from a communication device a network access request, the network access request received via an established session with a first communication network, and the network access request indicating a request by the communication device to modify a parameter of the established session;

a resource controller based on the network access request, configured to determine a policy decision on the modified parameter of the session, and determine upon the basis of the network access request as to whether communication resources of the first communication network are available to reestablish the session with the new parameters for the communication device; and a network controller configured to select a second communication network and send a handover command to the communication device for another network reselection, if the communication resources are not available for the communication device, wherein the second communication network is selected by the communication device in response to determining that the second communication network has the communication resources.

12. The network selector according to claim 11, wherein the network controller is configured to transmit a network re-selection request to the communication device to select the second communication network.

* * * * *